March 6, 1951     C. FLECK     2,544,306

BALANCE WHEEL FOR TIMEPIECES

Filed Jan. 14, 1949

Inventor
Charles Fleck
By

Patented Mar. 6, 1951

2,544,306

UNITED STATES PATENT OFFICE 2,544,306

BALANCE WHEEL FOR TIMEPIECES

Charles Fleck, La Chaux de Fonds, Switzerland, assignor to S. A. Les Fabriques de Balanciers Reunies, Bienne, Switzerland Application January 14, 1949, Serial No. 70,909
In Switzerland February 23, 1948

5 Claims. (Cl. 58—107)

This invention relates to time-piece balance wheels and has for its object the provision of a new and improved method for adjusting the moment of inertia.

According to the invention, I provide a time-piece balance wheel having at least two groups of at least two adjusting screws in each group, the adjusting screws of each group having interengaging means for locking them by tightening against each other.

The annexed drawing shows, by way of example, a balance wheel construction embodying the invention.

The balance wheel 1 carries four balancing screws 2 and four groups of adjusting screws 3 and 4.

Figure 1:
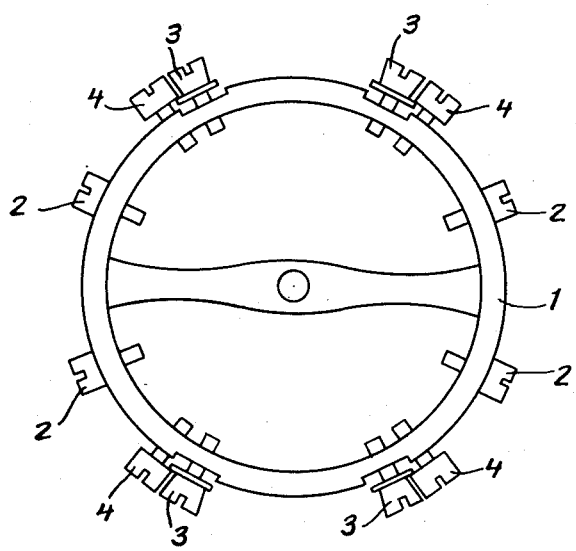
Fig. 1 is a plan view of a time-piece balance wheel.
Figure 2:
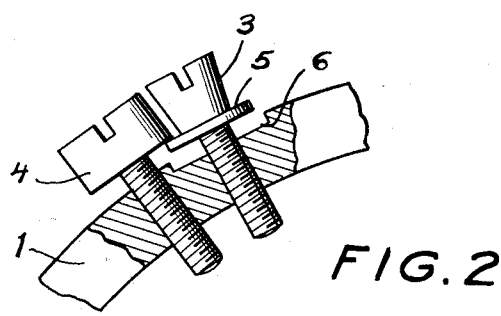
Fig. 2 is a detailed view with parts in section on enlarged scale of a group of interlocking screws.

One of those groups is shown in Fig. 2. The screw 3 which will be called "Key-screw" is formed at the base of its head with a collar 5 against which the head of the screw 4 is pressed. When the twin screws 3 and 4 are screwed tight, the collar 5 is lodged in a recess 6 provided in the outer surface of the balance wheel rim. The head of the screw 3 is in the shape of a truncated cone, while the head of the screw 4 is cylindrical.

When the balance wheel is balanced by means of the screws 2, adjustment of its moment of inertia can be effected by means of the groups of twin screws 3 and 4, the latter being locked against one another by the collar 5 thereby to prevent them from loosening by themselves.

The groups of adjusting screws could also comprise each three interlocking screws.

What I claim is:

1. A balance wheel for time-pieces comprising a rim, at least two groups of each at least two screws screwed in the outer face of said rim for adjusting the moment of inertia of the balance wheel, and interengaging means on the screws of each of said groups for locking said screws in adjusted position by tightening against one another.

2. A balance wheel for time-pieces comprising a rim, at least two groups of each at least two screws screwed in the outer face of said rim for adjusting the moment of inertia of the balance wheel, one of said adjusting screws in each group being formed with a collar adapted to engage the head of another screw thereby to lock said screws in adjusted position.

3. A balance wheel for time-pieces as claimed in claim 2 wherein the collar is formed at the base of the head of a screw.

4. A balance wheel as claimed in claim 2 wherein the collar is formed at the base of a screw head which is in the shape of a truncated cone while the associated screw has a cylindrical head.

5. A balance wheel as claimed in claim 2 wherein a recess is provided in the outer face of the rim for receiving the collar when the adjusting screws are screwed tight.

CHARLES FLECK.

No references cited.